W. H. LAWSON.
STEP BEARING.
APPLICATION FILED DEC. 15, 1909.

1,012,663.

Patented Dec. 26, 1911.

WITNESSES
Minnie S. Miller
Emma F. Carlson

INVENTOR
Welcome H. Lawson
BY
Frank W. Ashley
ATTORNEY

UNITED STATES PATENT OFFICE.

WELCOME H. LAWSON, OF POUGHKEEPSIE, NEW YORK.

STEP-BEARING.

1,012,663.  Specification of Letters Patent.  Patented Dec. 26, 1911.

Application filed December 15, 1909. Serial No. 533,130.

*To all whom it may concern:*

Be it known that I, WELCOME H. LAWSON, a citizen of the United States, and a resident of Poughkeepsie, in the county of Dutchess and State of New York, have invented certain new and useful Improvements in Step-Bearings, of which the following is a specification.

My invention relates to step bearings and is particularly designed for use with machines of high speed.

The object of my invention is to provide a bearing in which the parts in contact may be quickly and cheaply renewed, in which the parts may be hardened at a low cost and in which the surfaces in contact may be lubricated in a simple and efficient manner.

Figure 1:
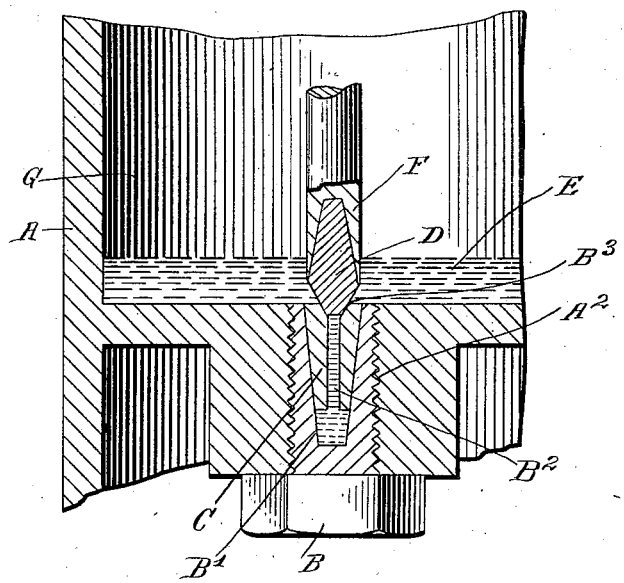
Figure 2:
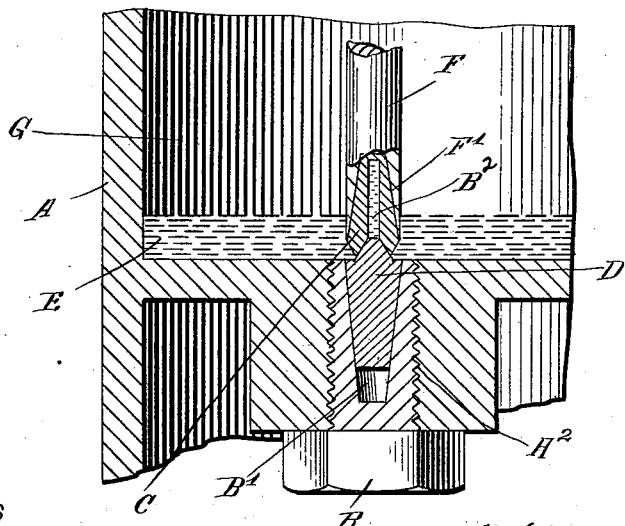

Referring to the drawings which form a part of this specification, Figure 1 is a vertical sectional view through a part of the frame of a machine and through my improved bearing which is located therein. Fig. 2 is a similar view showing the elements of the bearings in reversed position.

A, indicates the lower end of the frame of a machine such for illustration as a milk separator and is provided with a threaded opening $A^2$ in which is fitted and secured screw B, the upper end of which is recessed to form a cone shaped bearing surface $B'$.

Referring to Fig. 1, a cone shaped bearing element C is located in the cone shaped recess $B'$ and is provided with a central passage $B^2$ which terminates in a cone shaped surface $B^3$.

F indicates a rotating shaft which is provided with a cone shaped recess $F'$ in which is located a cone shaped bearing element D, the lower end of which is formed to fit the cone shaped surface $B^3$ in element C.

E indicates oil for lubricating said surfaces.

Referring to Fig. 2, the shaft F in this case carries the element C and the screw B carries the element D. The object is to make the wearing parts interchangeable as for illustration C will fit the shaft F or screw B. The elements C and D are preferably made of hardened steel. To adjust the bearings relative to each other, the screw B may be moved up or down relative to the shaft F to the desired degree.

Should the oil escape from the chamber G, a certain amount of oil would remain in the passage $B^2$ and in case the abutting surfaces should run dry, the element C and element D would become heated thus heating the oil and causing the expansion thereof to force the oil between the surfaces of the bearing to effect a temporary lubrication of the same.

By reason of the passage or opening $B^2$, the element D will tend to wear central with the element C and it has been found in practice that by removing the middle portion represented by the passage $B^2$ in the element C the parts wear much better and are more easily kept properly lubricated.

Having thus described my invention what I claim as new and desire to secure by Letters Patent is:

1. A machine having an oil chamber; a screw having a recess at one end thereof communicating directly with said oil chamber; a bearing element in said recess; a shaft having a bearing element rigidly connected in one end thereof, and in contact with said first named bearing element, one of said elements being provided with a central chamber, closed by the opposite bearing element and adapted to hold oil, and fluid means in said chamber having a greater coefficient of expansion than that of said bearing elements, for the purpose set forth.

2. A machine having an oil chamber; a screw one end of which communicates therewith; a bearing element held rigidly in said screw; a shaft; a bearing element located and held rigidly in one end thereof and coacting directly with said first named bearing element, one of said bearing elements having a passage closed by one of said bearing elements and adapted to hold oil; oil in said passage which serves as an expansion medium to separate said bearing elements, each of said bearing elements having a cone shaped exterior surface adapted to fit either said shaft or said screw.

3. A step bearing comprising a screw having a cone shaped surface therein; a bearing element located in said cone shaped surface and having a passage therein closed by the opposite bearing element; an expansible fluid lubricating medium therein; a shaft; a bearing element in said shaft having a cone shaped surface adapted to fit the cone in the recess of said screw, said elements having their ends in direct contact and formed to co-act as a bearing.

4. A step bearing comprising a screw and a shaft, each of which is provided with a bearing element in direct contact with each other, one of said bearing elements having an opening therein which is closed by the opposite bearing element and thereby forms a tightly closed chamber; and an expansible lubricating fluid located in said opening for the purpose set forth.

5. A step bearing comprising a screw and a shaft each of which is provided with a bearing element in direct contact with each other, one of said bearing elements having a passage therein closed at one end by said screw and at its opposite end by the opposite bearing element; and an expansible fluid located in said passage for the purpose set forth.

6. A step bearing comprising two holding members; two bearing elements held thereby in direct contact with each other, one of said elements having an opening formed therein one end of which is closed by one of said holding members, and the opposite end closed by the opposite bearing element; and an expansible fluid lubricant located in said opening.

7. A step bearing comprising two contacting elements, one of which is provided with a chamber; an expansible fluid filling said chamber; and a second bearing element arranged to close said chamber and trap the oil therein.

Signed at New York city, in the county of New York and State of New York this 10th day of December, A. D. 1909.

WELCOME H. LAWSON.

Witnesses:
FRANK M. ASHLEY,
MINNIE S. MILLER.

---

Copies of this patent may be obtained for five cents each, by addressing the "Commissioner of Patents, Washington, D. C."